United States Patent [19]
Lipton et al.

[11] Patent Number: 5,579,501
[45] Date of Patent: Nov. 26, 1996

[54] METHOD FOR TRANSFORMING A HASH BUCKET NUMBER TO A CONTROL INTERVAL TO IDENTIFY THE PHYSICAL LOCATION OF INFORMATION IN A MASS MEMORY

[75] Inventors: Arnold S. Lipton; Mariam P. Sanford, both of Phoenix; David A. Egolf; David W. Wagner, both of Glendale; Todd B. Kneisel, Phoenix; Michael L. Giroux, Glendale, all of Ariz.

[73] Assignee: Bull HN Information Systems Inc., Billerica, Mass.

[21] Appl. No.: 347,005

[22] Filed: Nov. 30, 1994

[51] Int. Cl.⁶ .................................................. G06F 12/08
[52] U.S. Cl. ........................ 395/421.06; 395/413
[58] Field of Search .............. 395/421.06, 413, 395/600

Primary Examiner—Jack A. Lane
Attorney, Agent, or Firm—James H. Phillips; John S. Solakian

[57] ABSTRACT

A method for addressing mass memory in which information is stored in control intervals of physically contiguous disk segments subject to irregularities in the mapping is disclosed. Such irregularities may include discontinuities at some regular interval, which may or may not be 2ⁿ, and/or offset from zero with respect to a virtual address employed by a user. Within the method, a unique hashing algorithm is employed to convert a virtual address to a physical address taking into account such irregularities in the mapping. This algorithm is particularly characterized by its use of integer binary arithmetic which results in high speed and complete accuracy. For the special and common condition in which discontinuities appearing at some regular interval of 2ⁿ, a similar disclosed algorithm may be employed to achieve even greater speed of address transformation.

8 Claims, 4 Drawing Sheets

METHOD FOR TRANSFORMING A HASH BUCKET NUMBER TO A CONTROL INTERVAL TO IDENTIFY THE PHYSICAL LOCATION OF INFORMATION IN A MASS MEMORY

FIELD OF THE INVENTION

This invention relates to the art of data storage and retrieval and, more particularly, to the transformation of a hash bucket number to a physical address on a storage medium during such storage and retrieval.

BACKGROUND OF THE INVENTION

As is well known in the art, the fundamental concept of a hash is to provide repeatable mathematical algorithm that will accept a key input value which is processed by a special algorithm into a numeric output value in a known range of numbers. The numeric output value is known as a hash bucket number and, in the data processing art, is used as an identifier to describe the physical memory location(s) in which data records are to be stored or retrieved from. Thus, within process for storing and retrieving data records, once a data record has been placed in memory (typically, a disk memory) using a hashing algorithm as a step in the storage process, then access to the data record can be obtained by reuse of the hashing algorithm to locate the record in the counterpart retrieval process.

For the algorithms, hash bucket numbers are logically contiguous numbers which can range from 1 to n. Control interval (hereinafter "CI") numbers are physically contiguous disk segments also numbered from 1 to n. Irregularities in the mapping may exist as follows:

1) The first bucket (bucket number 0) may not start at CI number 0.
2) There may be multiple buckets per CI.
3) There may be multiple CIs per bucket.
4) Discontinuities may exist in the CI range at some regular interval.

For example, a disk organization scheme may place special CIs at regular intervals to efficiently manage disk space usage. Therefore, when mapping a hash bucket to a CI, these discontinuities must be dealt with by a hashing algorithm. Further, those skilled in the art will appreciate that a hashing algorithm must be absolutely accurate and also highly efficient and fast in order that the transformation process can proceed very quickly and not significantly lower system performance.

OBJECTS OF THE INVENTION

It is therefore a broad object of this invention to provide an improved virtual-to-real address translation capability in a computer system.

It is a more specific object of this invention to provide such address translation capability which employs a unique hashing process.

Still more particularly, it is an object of this invention to provide such address translation capability by employing a unique hashing process that requires only the use of integer arithmetic.

In another aspect, it is an object of this invention to provide such address translation capability that is highly efficient and absolutely accurate.

SUMMARY OF THE INVENTION

Briefly, these and other objects of the invention are achieved, in a s computer system including a user interface, a processor and a mass memory which stores information in physically contiguous memory location segments which are interrupted by discontinuities at a regular interval, by a hashing process for identifying the physical locations in the mass memory to be accessed by the user interface. For each set of information to be stored in the mass memory, a set of characteristics are established which include at least the regular interval at which discontinuities appear and any offset from the first physical location in the relevant subdivision of the mass memory at which the first record of the information set is to be stored. A virtual identification specified from the user interface is either converted to, or already is, a hash bucket# which can be transformed by the processor to a physical address in the mass memory using the special hashing algorithms disclosed. These algorithms can operate in integer binary arithmetic and are thus very fast and accurate. A first algorithm, which can handle any interval, includes the steps:

1) obtaining a value "MIN" by employing the equation:

MIN=BUCKET#/(INTERVAL−1);

2) obtaining a value "CLOSE" by employing the equation:

CLOSE=(MIN * INTERVAL)+START_CI;

3) obtaining a value "DIST" by employing the equation:

DIST=INTERVAL−(CLOSE MOD INTERVAL)

in which the term "CLOSE MOD INTERVAL" means the remainder of CLOSE divided by INTERVAL;

4) making a YES/NO decision by making the determination:

(BUCKET#−(MIN * (INTERVAL−1))) <DIST?;

5) if the decision in sub-step 4) is YES, obtaining the CI# by employing the equation:

CI#=START_CI+BUCKET#+MIN;

(6) if the decision in sub-step 4) is NO, obtaining the CI# by employing the equation:

CI#=START_CI+BUCKET#+MIN+1.

Once the physical location in the mass memory has been developed by the hashing algorithm, the communications path between the user interface and the physical location can be established.

For the common configuration in which discontinuities in the mass memory occur at regular intervals of 2", a similar, but faster, hashing algorithm may be employed. This version includes the steps:

1) obtaining a value "BCI#" by employing the equation:

BCI#=BUCKET#;

2) obtaining a trial value "CI#" by employing the equation:

CI#=BCI#+START_CI;

3) obtaining a revised interval value "INTERVAL" by employing the equation:

INTERVAL=INTERVAL−1;

4) obtaining a revised value "BCI#" by employing the equation:

BCI#=BCI#−((START_CI+INTERVAL) & ~INTERVAL)− START_CI where the operator "&" is a logical AND and the operator "~" is a logical NOT;

5) making a YES/NO decision by making the determination:

BCI#>=0?;

6) if the decision in sub-step 5) is YES, obtaining the CI# by employing the equation:

CI#=CI#+(BCI#/INTERVAL)+1;

7) if the decision in sub-step 5) is NO, accepting the CI# obtained in sub-step 2) as the final CI#

For environments in which there may be multiple CIs per bucket# or multiple bucket#s per CI, a PER-IND value may be assigned and relevant preprocessing performed at the beginning of the algorithm used.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
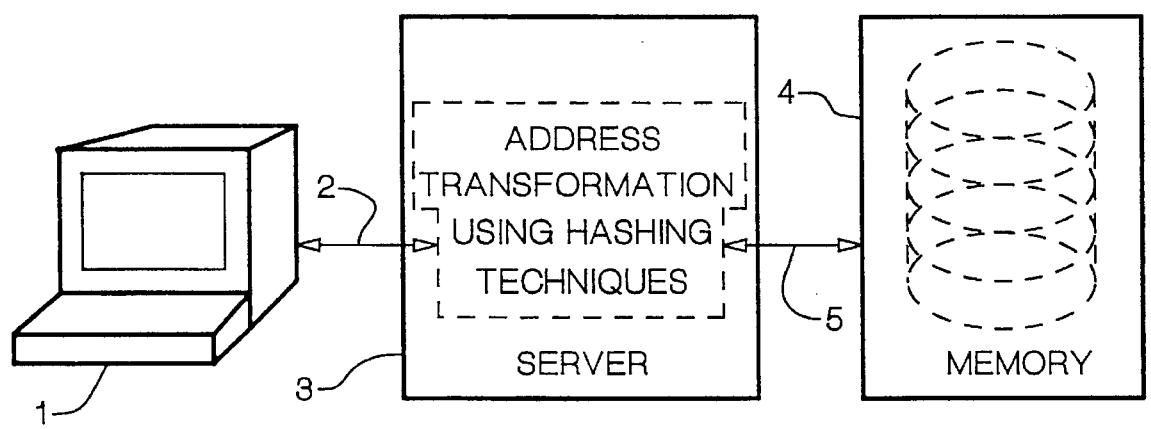
FIG. 1 is a generalized view of a typical computer system environment in which the invention may be practiced.

Attention is first directed to FIG. 1 which illustrates an exemplary environment in which the invention may be practiced. A work station 1 is s coupled by communications channel 2 (which may, for example, be a local area network) to a server 3. The server 3 may be a mainframe computer, a minicomputer or even a powerful workstation. The server 3 is also coupled to a mass memory 4 (which may, for example, be a large disk unit) by communications channel 5.

During normal operation, a user at the workstation 1 may wish to access a large database stored in the memory 4. Using the database interface appearing on the workstation screen and the workstation keyboard and/or a pointing device such as a mouse, the user can virtually specify the information it is desired to access, and this virtual address and an access request will be transmitted to the server 3.

Figure 3:
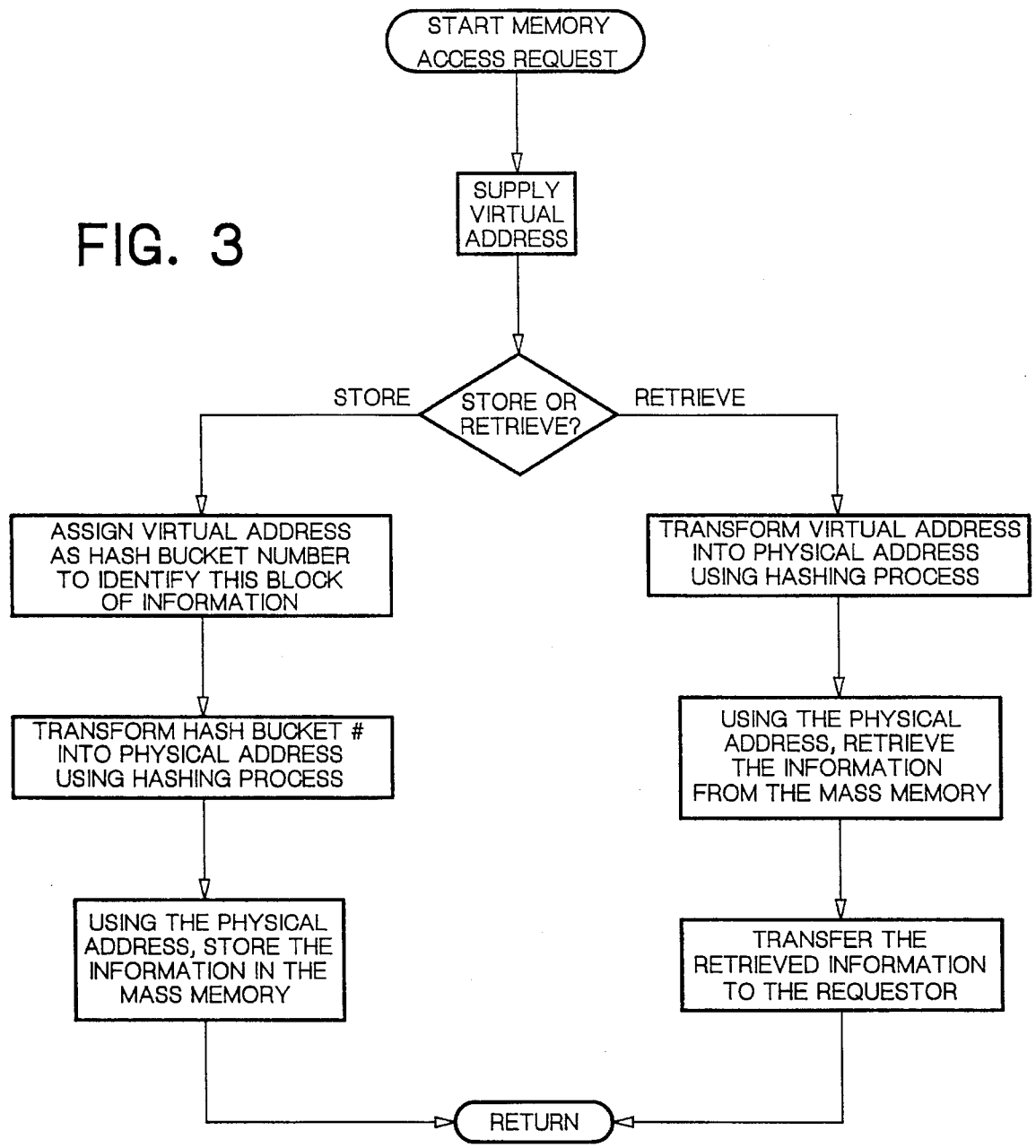
FIG. 3 is a high level flow chart illustrating the process steps of storing information into a mass memory and accessing previously stored information, both utilizing hashing techniques.

Referring also to the high level flow chart shown in FIG. 3, assume now that hashing techniques are used in the exemplary system and that access to an information record already stored in the mass memory 4 is sought. Either in the workstation 1 or in the server 3, depending upon the system software and other factors, the virtual specification of the location of the desired information will be convened, if necessary, to one of a series of sequentially contiguous hash bucket numbers or virtual addresses in preparation for accessing the memory. However, for the reasons discussed above, this virtual address (the hash bucket number) may still not be, and usually is not, the physical address of the desired information as it is actually stored in the memory 4. The hash bucket number, therefore, must be transformed to a physical address before the actual memory access can be performed. According to the present invention, this transformation is effected by a unique hashing algorithm which runs in the server 3 in the example.

Similarly, if it is desired to store a new block of information into mass memory, a hash bucket number will be selected and used to develop a CI number using the same hashing algorithm to develop a physical address in which the information is stored. Thereafter, the selected hash bucket number is used to virtually identify that specific block of information. Typically, the selected hash bucket number is the next sequentially available; i.e., previously unused.

Figure 2:
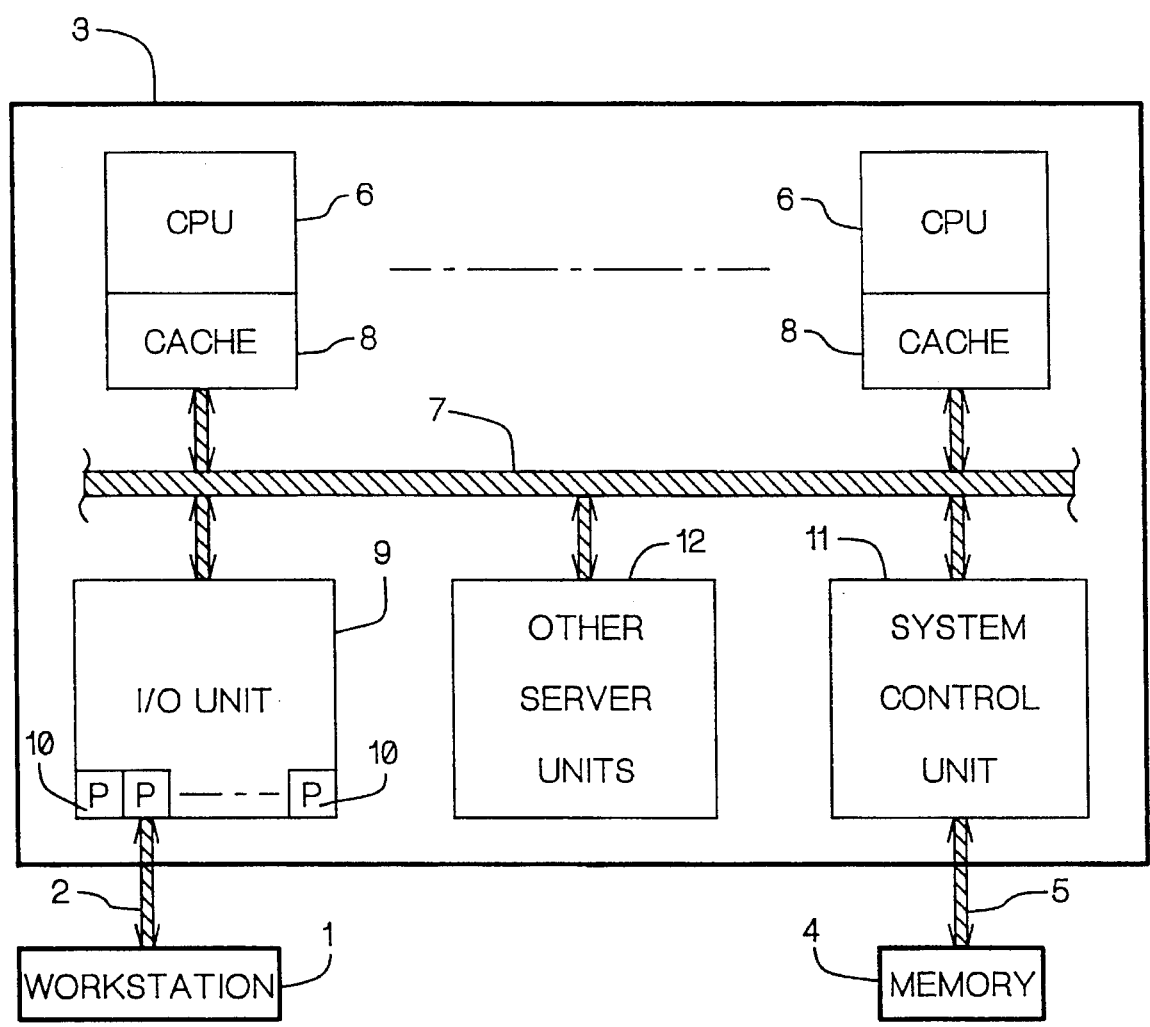
FIG. 2 is a high level block diagram of a server component of the computer system.

FIG. 2 is a high level block diagram of an exemplary server 3 which may include one or more central processing units 6 interfacing to a system bus 7 via individual caches 8. An I/O unit 9 also interfaces to the system bus 7 and includes one or more ports 10. The workstation 1 is coupled to the server 3 at one of the ports 10, and those skilled in the art will understand that other, even many other, workstations may be similarly coupled to the server 3. The mass memory 4, in the example, communicates with the server 3 via a system control unit 11 which also interfaces to the system bus 7. Other server units which may be present in a given system are represented by the block 12.

Thus, a request for access to the mass memory 4 received by the server 3 from the workstation 1 proceeds through a port 10 of the I/O unit 9 to the system bus 7 and to a CPU 6 via a cache 8. In the CPU, the access request is interpreted and the hashing process is instituted to transform the specified hash bucket number to the physical address on the memory 4. The program routine for running the hashing algorithm may either be resident in the cache 8 or itself called by the CPU from memory 4. When the address transformation has been completed, the CPU issues a request to the memory 4, via the system bus 7 and SCU 11, which includes the physical address of the desired block of information. The memory sends the requested information to the server 3 which directs it to the requesting workstation 1.

Figure 4:
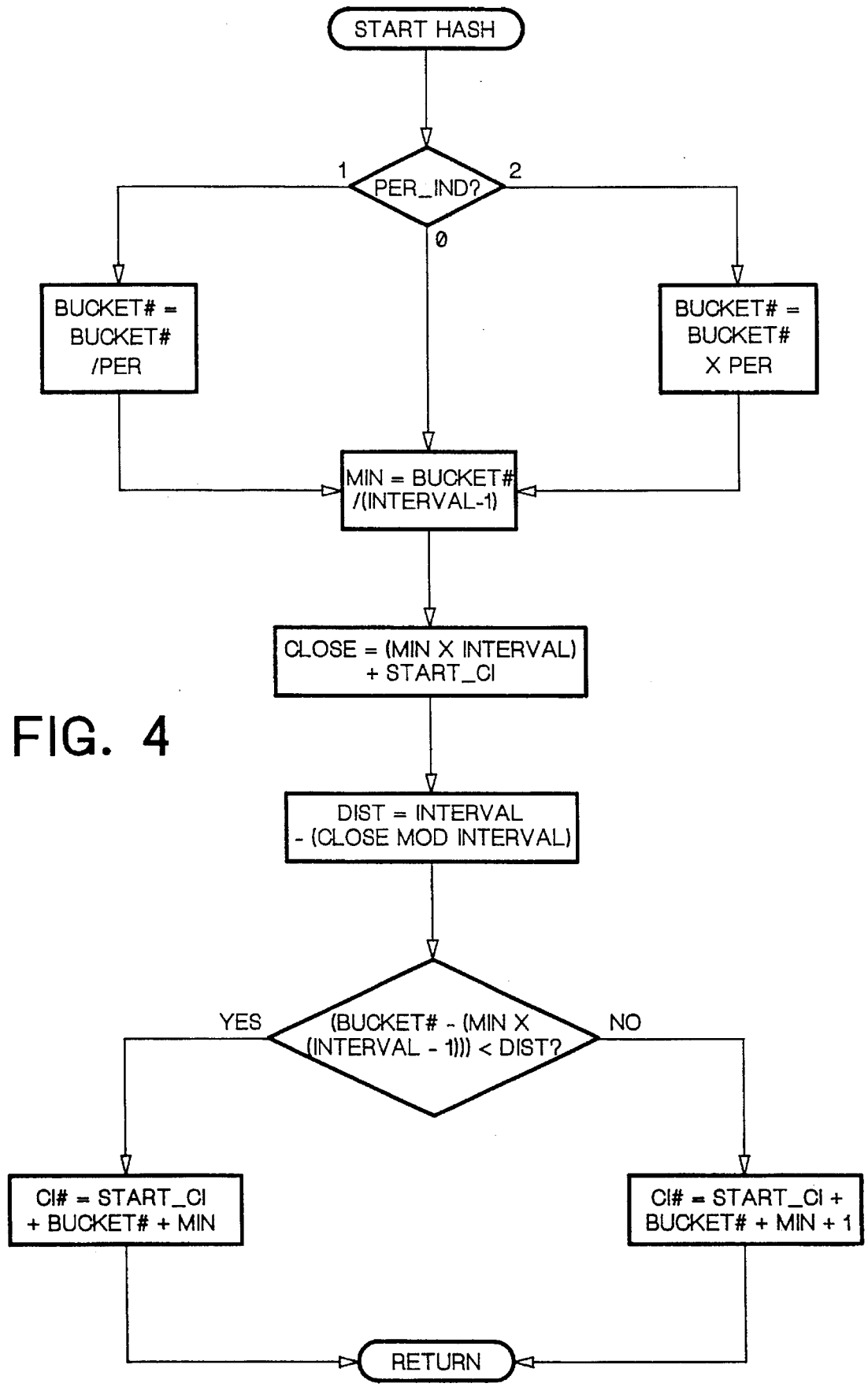
FIG. 4 is a flow chart of a hashing process according to the present invention.

Consider now, with reference to FIG. 4, the basic algorithm which constitutes a key aspect of the present invention. Hash bucket numbers are logically contiguous numbers which can range from 1 to n. CI numbers are physically contiguous disk segments also numbered from 1 to n. Example 1 below illustrates an exemplary CI layout with discontinuities every 512 CIs and the corresponding bucket-to-CI mapping. For this example, it is assumed that there is one bucket per CI, that there are 512 buckets in the hash and that bucket 0 starts at CI 4. Although an algorithm to efficiently and quickly map a bucket number to a CI number may appear quite simple upon original consideration, it is in fact not at all obvious because of the need to treat the discontinuities and because of the fact that Bucket 0 may start at any given CI.

EXAMPLE 1

---

CI0
CI1
CI2
CI3
CI4 = bucket 0
CI5 = bucket 1
CI6 = bucket 2
—
—
CI511 = bucket 507
CI512 [reserved]
CI513 = bucket 508
CI514 = bucket 509
CI515 = bucket 510
CI516 = bucket 511
CI517 = bucket 512
CI518

---

The process charted in FIG. 4 is a general purpose algorithm which will map a bucket number to a CI number where, as in the present example, discontinuities may exist at any regular interval and bucket 0 may be placed at any CI number. It will be noted that all calculations are performed using integer arithmetic which contributes very significantly to the efficiency and speed of the address transformation process.

INPUTS:

START_CI—the CI number of bucket number 0.

INTERVAL—the interval of intervening discontinuities.

BUCKET#—the bucket number to be mapped to a CI.

PER_IND—an indicator set as follows:
 0=1 bucket per CI
 1=multiple buckets per CI
 2=multiple CIs per bucket.

PER—if PER_IND=0 this field is not used.
 —if PER_IND=1 this field is the number of buckets per CI.
 =if PER_IND=2 this field is the number of CIs per bucket.

OUTPUTS:

CI#—the CI number where the desired bucket is located.

INTERNAL VARIABLES:

MIN—used to hold intermediate values in the calculation related to the number of intervening discontinuities.

CLOSE—used to hold intermediate values in the calculation related to the output CI#.

DIST—used to hold intermediate values in the calculation related to the number of CIs to the next discontinuity.

For the example, then:

START_CI=4

INTERVAL=512

PER_IND =0

PER=[not used in the example]

Assume, as an example only, that information already stored in the memory location virtually specified by bucket#1000 is to be accessed. Therefore, progressing through the steps in the algorithm:

Equation 1 MIN=1000/511=1

Equation 2 CLOSE=512+4=516

Equation 3 DIST=512−4=508

Equation 4 DECISION ANSWER IS YES; i.e., (1000−511)<508

Equation 5 CI#=4+1000+1=1005

Because integer arithmetic is used, more particularly, binary integer arithmetic, the result of Equation 1 is "1". In Equation 3, those skilled in the terminology of mathematics will understand that the term "CLOSE MOD INTERVAL" means the remainder of CLOSE divided by INTERVAL which is "4" in the example.

EXAMPLE 2

Figure 5:
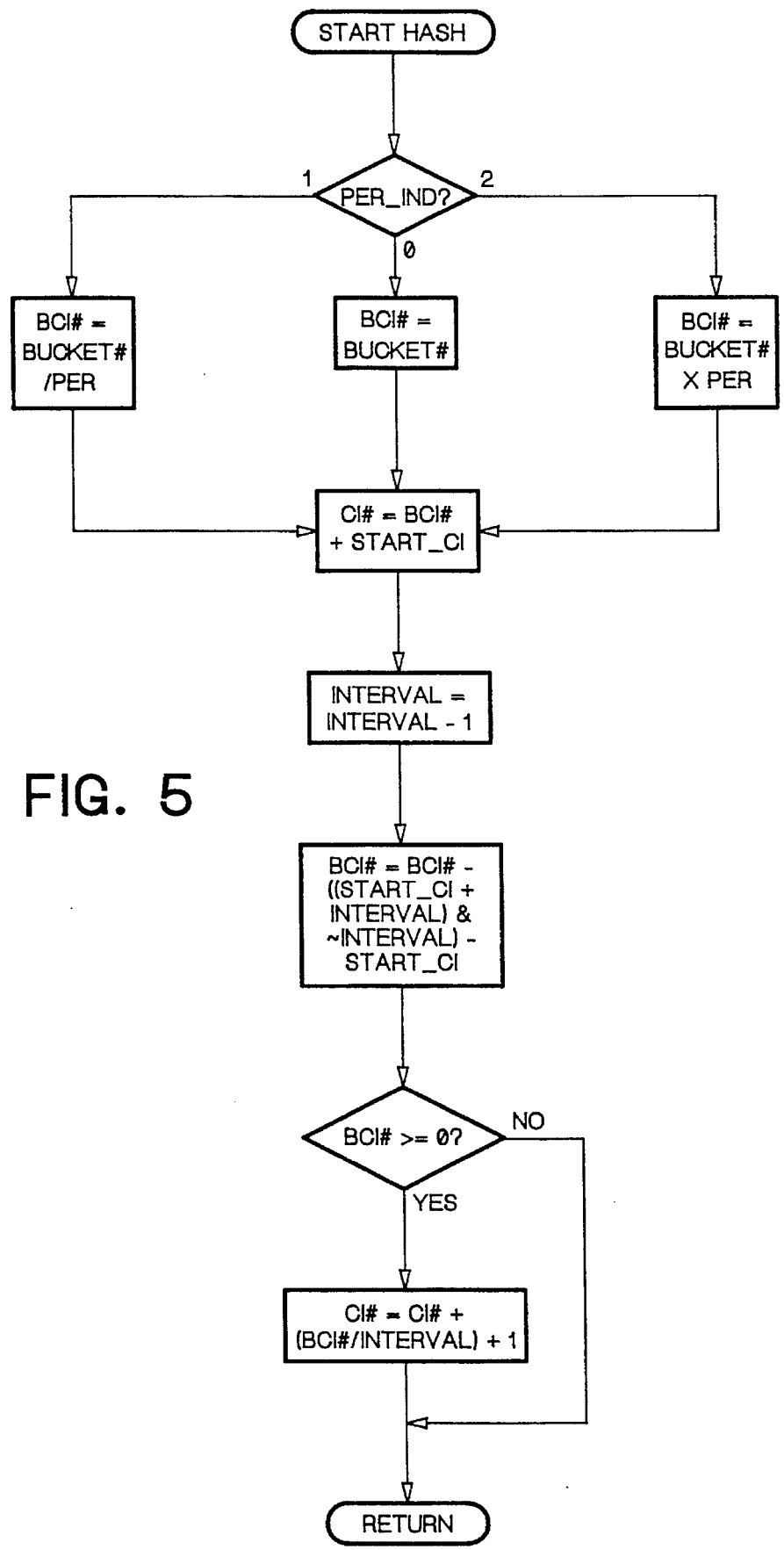
FIG. 5 is a flow chart of a special condition of the process shown in FIG. 4.

The algorithm shown in FIG. 5 is a special case of the algorithm shown in FIG. 4 in which the discontinuity interval is at every $2^n$ CIs., where n>=1. It has been found that when the interval is limited to some power of two, the algorithm can be made even more efficient. Again, it should be noted that all calculations are performed using integer arithmetic. The inputs and outputs are the same as discussed above for the algorithm of FIG. 4. However, the only internal variable used is BCI# which is used to hold intermediate values in the calculation.

Assume the same starting conditions as previously set for Example 1.

Thus:

Equation 6 BCI#=1000

Equation 7 CI#=1000+4=1004

Equation 8 INTERVAL=512−1=511

Equation 9 BCI#=1000−(515 AND NOT511)−4=484

Equation 10 DECISION ANSWER IS YES

Equation 11 CI#=1004+(0)+1=1005

The parenthetical component I Equation 9 may require brief explanation. The symbol "&" means a logical AND, and the symbol "~" means a logical NOT. Assuming for example only, sixteen-bit integer binary arithmetic:

515=0000001000000011

511=0000000111111111

NOT511=1111111000000000

0000001000011                   AND
 1111111000000000=0000001000000000=512

Thus, 1000−512−4=484

For each of the algorithms discussed above and shown in FIGS. 4 and 5, similar exercises can be run in which PER_IND=1 and 2. While the algorithms have been discussed in the context of a hash bucket-to-CI transformation, it will be understood that these same algorithms may also be used in other domains where a similar type mapping is required.

In addition, while the environment of the invention has been disclosed as that of a workstation in communication with a server which is in further communication with a mass memory, those skilled in the art will understand that numerous system configurations exist in which the invention may be practiced with equal advantage.

Thus, while the principles of the invention have now been made clear in an illustrative embodiment, there will be immediately obvious to those skilled in the art many modifications used in the practice of the invention which are particularly adapted for specific environments and operating requirements without departing from those principles.

What is claimed is:

1. In a computer system including a user interface, a processor and a mass memory, which mass memory stores information in physically contiguous memory location segments which are interrupted by discontinuities at a regular interval, a process for communicating between the user interface and the mass memory comprising the steps of:

A) establishing, for each set of information to be stored in the mass memory with which the process will be used, a set of characteristics which include at least:
 1) the regular interval at which discontinuities appear, the "INTERVAL"; and
 2) any offset from a first physical location in a relevant subdivision of the mass memory at which the first record of an information set is to be stored, the "START_CI";

B) employing the user interface to specify a virtual identification for the physical location to be accessed in the mass memory;

C) relating the virtual identification to a hash bucket number, the "BUCKET#", in a series of sequentially contiguous hash bucket numbers;

E) in the processor, transforming the hash bucket number into a physical location "CI#" in the mass memory employing an integer arithmetic hashing process comprising the following sub-steps:
 1) obtaining a value "M1N" by employing the equation:

MIN=BUCKET#/(INTERVAL−1);

2) obtaining a value "CLOSE" by employing the equation:

CLOSE=(MIN * INTERVAL)+START_CI;

3) obtaining a value "DIST" by employing the equation:

DIST=INTERVAL−(CLOSE MOD INTERVAL)

in which the term "CLOSE MOD INTERVAL" means the remainder of CLOSE divided by INTERVAL;
 4) making a YES/NO decision by making the determination:

(BUCKET#−(MIN * (INTERVAL−1)))<DIST?;

5) if the decision in sub-step 4) is YES, obtaining the CI# by employing the equation:

CI#=START_CI+BUCKET#+MIN;

6) if the decision in sub-step 4) is NO, obtaining the CI# by employing the equation:

CI#=START−CI+BUCKET#+MIN+1; and

F) using the CI# to identify the physical location to be accessed in the mass memory to thereby facilitate the establishment of a communications path between the user interface and the identified physical location in the mass memory.

2. The process of claim 1 in which the virtual identification is the BUCKET#.

3. In a computer system including a user interface, a processor and a mass memory, which mass memory stores information in physically contiguous memory location segments which are interrupted by discontinuities at a regular interval, a process for communicating between the user interface and the mass memory by specifying a virtual identification value comprising the steps of:

A) establishing, for each set of information to be stored in the mass memory with which the process will be used, a set of characteristics which include:
 1) the regular interval at which discontinuities appear, the "INTERVAL";
 2) any offset from a first physical location in a relevant subdivision of the mass memory at which the first record of an information set is to be stored, the "START_CI"; and
 3) a "PER_IND" value determined as follows:
  a) if a virtual identification value has a single counterpart segment in the mass memory, set the PER_IND value to a first number;
  b) if a plurality of virtual identification values map to a single counterpart segment in the mass memory, set the PER_IND value to a second number; and
  c) if a virtual identification value has a plurality of counterpart segments in the mass memory, set the PER_IND value to a third number;

B) employing the user interface to specify a virtual identification value for the physical location to be accessed in the mass memory;

C) relating the virtual identification value to a hash bucket number, the "original BUCKET#", in a series of sequentially contiguous hash bucket numbers;

E) in the processor, transforming the hash bucket number into a physical location "CI#" in the mass memory employing an integer arithmetic hashing process comprising the following sub-steps:
 1) examining the PER_IND value;
 2) if the PER_IND value is the first number, go to sub-step 5);
 3) if the PER_IND value is the second number, obtain a revised BUCKET# to be used following this sub-step by dividing the original BUCKET# by the second number and then going to sub-step 5;
 4) if the PER_IND value is the third number, obtain a revised BUCKET# to be used following this sub-step by multiplying the original BUCKET# by the third number;
 5) obtaining a value "MIN" by employing the equation:

MIN=BUCKET#/(INTERVAL−1);

6) obtaining a value "CLOSE" by employing the equation:

CLOSE=(MIN * INTERVAL)+START_CI;

7) obtaining a value "DIST" by employing the equation:

DIST=INTERVAL−(CLOSE MOD INTERVAL)

in which the term "CLOSE MOD INTERVAL" means the remainder of CLOSE divided by INTERVAL;
 8) making a YES/NO decision by making the determination:

(BUCKET#−(MIN * (INTERVAL−1)))<DIST?;

9) if the decision in sub-step 8) is YES, obtaining the CI# by employing the equation:

CI#=START_CI+BUCKET#+MIN;

10) if the decision in sub-step 8) is NO, obtaining the CI# by employing the equation:

CI#=START_CI+BUCKET#+MIN+1; and

F) using the CI# to identify the physical location to be accessed in the mass memory to thereby facilitate the establishment of a communications path between the user interface and the identified physical location in the mass memory.

4. The process of claim 2 in which the virtual identification is the original BUCKET#.

5. In a computer system including a user interface, a processor and a mass memory, which mass memory stores information in physically contiguous memory location segments which are interrupted by discontinuities at a regular interval of $2^n$, a process for communicating between the user interface and the mass memory comprising the steps of:

A) establishing, for each set of information to be stored in the mass memory with which the process will be used, a set of characteristics which include at least:
 1) the regular interval of $2^n$ at which discontinuities appear, the "INTERVAL"; and
 2) any offset from a first physical location in a relevant subdivision of the mass memory at which the first record of an information set is to be stored, the "START_CI";

B) employing the user interface to specify a virtual identification for the physical location to be accessed in the mass memory;

C) relating the virtual identification to a hash bucket number, the "BUCKET#", in a series of sequentially contiguous hash bucket numbers;

E) in the processor, transforming the hash bucket number into a physical location "CI#" in the mass memory employing an integer arithmetic hashing process comprising the following sub-steps:
 1) obtaining a value "BCI#" by employing the equation:

BCI#=BUCKET#;

2) obtaining a trial value "CI#" by employing the equation:

CI#=BCI#+START_CI;

3) obtaining a revised interval value "INTERVAL" by employing the equation:

INTERVAL=INTERVAL−1;

4) obtaining a revised value "BCI#" by employing the equation:

BCI#=BCI#−((START_CI+INTERVAL) & ~INTERVAL)−START_CI where the operator "&" is a logical AND and the operator "~" is a logical NOT;
 5) making a YES/NO decision by making the determination:

BCI#>=0?;

6) if the decision in sub-step 5) is YES, obtaining the CI# by employing the equation:

CI#=CI#+(BCI#/INTERVAL)+1;

7) if the decision in sub-step 5) is NO, accepting the CI# obtained in substep 2) as the final CI#; and F) using the CI# to identify the physical location to be accessed in the mass memory to thereby facilitate the establishment of a communications path between the user interface and the identified physical location in the mass memory.

6. The process of claim 5 in which the virtual identification is the BUCKET#.

7. In a computer system including a user interface, a processor and a mass memory, which mass memory stores information in physically contiguous memory location segments which are interrupted by discontinuities at a regular interval of $2^n$, a process for communicating between the user interface and the mass memory by specifying a virtual identification value comprising the steps of:

A) establishing, for each set of information to be stored in the mass memory with which the process will be used, a set of characteristics which include:
 1) the regular interval of $2^n$ at which discontinuities appear, the "INTERVAL";
 2) any offset from a first physical location in a relevant subdivision of the mass memory at which the first record of an information set is to be stored, the "START_CI"; and
 3) a "PER_IND" value determined as follows:
  a) if a virtual identification value has a single counterpart segment in the mass memory, set the PER_IND value to a first number;
  b) if a plurality of virtual identification values map to a single counterpart segment in the mass memory, set the PER_IND value to a second number; and
  c) if a virtual identification value has a plurality of counterpart number;

B) employing the user interface to specify a virtual identification value for the physical location to be accessed in the mass memory;

C) relating the virtual identification value to a hash bucket number, the "BUCKET#", in a series of sequentially contiguous hash bucket numbers;

E) in the processor, transforming the hash bucket number into a physical location "CI#" in the mass memory employing an integer arithmetic hashing process comprising the following sub-steps:
 1) examining the PER_IND value;
 2) if the PER_IND value is the first number, obtaining a value "BCI#" by employing the equation:

BCI#=BUCKET# and then going to sub-step 5);
 3) if the PER_IND value is the second number, obtaining a value "BCI" by employing the equation:

BCI#=BUCKET#/PER;

and then going to sub-step 5;
 4) if the PER_IND value is the third number, obtaining a value "BCI#" by employing the equation:

BCI#=BUCKET#* PER;

5) obtaining a trial value "CI#" by employing the equation:

CI#=BCI#+START_CI;

6) obtaining a revised interval value "INTERVAL" by employing the equation:

INTERVAL=INTERVAL−1;

7) obtaining a revised value "BCI#" by employing the equation:

BCI#=BCI#−((START_CI+INTERVAL) & ~INTERVAL)−START_CI where the operator "&" is a logical AND and the operator "~" is a logical NOT;

8) making a YES/NO decision by making the determination:

BCI#>=0?;

9) if the decision in sub-step 8) is YES, obtaining the CI# by employing the equation:

CI#=CI#+(BCI#/INTERVAL;)+1;

10) if the decision in sub-step 8) is NO, accepting the CI# obtained in sub-step 2) as the final CI#; and F) using the CI# to identify the physical location to be accessed in the mass memory to thereby facilitate the establishment of a communications path between the user interface and the identified physical location in the mass memory.

8. The process of claim 6 in which the virtual identification is the BUCKET#.

* * * * *